United States Patent [19]

Heiss

[11] Patent Number: 5,476,890

[45] Date of Patent: Dec. 19, 1995

[54] RUST CONVERTING-AND-INHIBITING WATER-THINNABLE PAINT PRIMER

[76] Inventor: Adolf Heiss, P.O. Box 3595, Jersey City, N.J. 07302

[21] Appl. No.: 279,690

[22] Filed: Jul. 25, 1994

Related U.S. Application Data

[63] Continuation-in-part of Ser. No. 935,142, Aug. 24, 1992, abandoned, which is a continuation of Ser. No. 435,708, Nov. 13, 1989, abandoned.

[51] Int. Cl.$^6$ ........................................... C08K 3/20
[52] U.S. Cl. ........................... 524/244; 524/376; 524/431; 524/513
[58] Field of Search ................................... 524/244, 376, 524/431, 513

[56] References Cited

U.S. PATENT DOCUMENTS 4,462,829  7/1984  Heiss ..................................... 186/14.13
4,567,246  1/1986  Gajria et al. ....................... 526/318.44

Primary Examiner—Peter D. Mulcahy
Attorney, Agent, or Firm—Adams & Wilks

[57] ABSTRACT

A water-thinnable primer effectively adherent to rusted metal and other substrates and to a variety of top coats has the form of an aqueous emulsion or aqueous suspension of a vinylidene chloride-vinylchloride copolymer and an alkyd resin, the alkyd resin being present in the amount of about ⅙ to ¼ by weight of the vinylidene chloride-vinyl chloride copolymer, about 3 to 5% by weight of triethanolamine oleate as ionic surfactant, a drying accelerator composed of at least one polyvalent metal salt in an amount of about 1 to 4% by weight, about 8 to 15% by weight of a coalescing agent, and about 30 to 70% by weight of a pigment, all based on the weight of the total resin content of the primer.

16 Claims, No Drawings

RUST CONVERTING-AND-INHIBITING WATER-THINNABLE PAINT PRIMER

This is a continuation-in-part of application Ser. No. 07/935,142 filed Aug. 24, 1992 now abandoned, which is a continuation of application Ser. No. 07/435,708 filed Nov. 13, 1989 now abandoned.

FIELD OF THE INVENTION

This invention relates to a coating primer composition and is more particularly concerned with a primer composition effective to coat a wide variety of substrates, including rusted iron, as well as to adhere firmly to a wide variety of coatings applied to it when it is coated upon a supporting surface. The invention is especially concerned with a water-thinnable primer.

BACKGROUND OF THE INVENTION

The provision of a primer composition which will adhere to numerous types of surfaces, particularly rusted iron, which will adhere to a wide variety of applied coatings, and which, at the same time is water-thinnable, presents a serious practical problem.

British Patent No. 915,512 discloses a nonaqueous primer with rust-inhibiting properties, the primer containing a phosphate of calcium or zinc as the rust inhibitor.

In U.S. Pat. No. 4,064,084, a corrosion-inhibiting coating is disclosed, but the coating must be heated to a temperature of 500°–900° F. to effect a cure, which is an obvious disadvantage.

U.S. Pat. No. 4,086,182 describes a composition which gives a corrosion-resistant film, but the product when applied to rusted iron or steel turns deep black in color and must be removed prior to the application of another coating since it does not adhere to a top coat.

In my prior U.S. Pat. No. 4,462,829, I disclose a highly effective rust-converting and rust-inhibiting primer but it has the disadvantage that it is not water thinnable and must be thinned with aliphatic solvents such as naphtha or mineral spirits. The primer compositions described in my prior patent have dispersing or emulsifying agents which enable dispersion of oil in water and which form a water-in-oil emulsion, but such emulsions are not water thinnable (reducible) and must be thinned by aliphatic solvents. More specifically, the film-forming resin is an alkyd resin which is present as an aqueous emulsion or aqueous suspension, but it must be thinned with aliphatic solvents or thinners which is not as environmentally clean as the water-thinnable product of this invention.

OBJECTS OF THE INVENTION

It is accordingly an object of the invention to provide a primer of novel composition, having improved properties.

It is another object of the invention to provide a composition of the character indicated which can be applied to a wide variety of substrates.

It is a further object of the invention to provide a rust-converting, rust-inhibiting primer which is miscible with water and therefore water-thinnable and which converts rust on the surface of a metal to an inactive or passive form and provides a coating which inhibits further corrosion.

SUMMARY OF THE INVENTION

These and other objects and features of the invention are obtained by a pigmented water-thinnable primer which is comprised of an aqueous emulsion or aqueous suspension of a vinylidene chloride-vinyl chloride copolymer, i.e., vinylidene chloride polymerized with vinyl chloride (up to about 10% vinyl chloride), and an alkyd resin, the alkyd resin being present in the amount of about ⅙ to ¼ by weight of the vinylidene chloride-vinyl chloride copolymer, about 3 to 5% by weight of a triethanolamine salt as ionic surfactant, a drying accelerator composed of at least one polyvalent metal salt in an amount of about 1 to 4% by weight, about 8 to 15% by weight of a coalescing agent, and about 30 to 70% by weight of a pigment, all based on the weight of the total resin content of the composition. The primer is free of acidic chelating agents such as oxalic, tannic and phosphoric acids and has a neutral pH in the range 6.5 to 7.5.

DETAILED DESCRIPTION OF THE PREFERRED EMBODIMENTS

The resin which is responsible for the formation of a film on the substrate upon which the primer composition of the invention is applied is the combination of a long-chain vinylidene chloride-vinyl chloride copolymer with an alkyd resin, preferably a medium or long air-dried oil-modified alkyd resin such as a soya or tall oil alkyd resin. Soya-phthalic anhydride alkyds are particularly preferred, e.g., containing 20–40% phthalic anhydride.

An ionic surfactant, effective as a dispersing or emulsifying agent, in the form of an amine salt, e.g., of a long-chain fatty acid, specifically triethanolamine oleate, optionally together with a non-ionic surfactant are employed to form an oil-in-water emulsion. As non-ionic surfactants, ethylene oxide or propylene oxide surfactants such as polyoxyethylene, ethoxylated alcohols, and the like with a high ethylene and/or propylene oxide content, can be suitably used. An acetylenic alcohol surfactant, such as the product known commercially as Surfynol, can also be used to form an oil-in-water emulsion.

The primer composition of the invention also contains a pigment. As pigment, the most preferred are red oxide ($Fe_2O_3$) and zinc oxide, but other well-known pigments, such as zinc phosphate, calcium borosilicate, sodium zirconium silicate, iron phosphate, magnesium silicate, barium metaborate, baryted, and the like, can also be used.

The coalescing agent is suitably a polyglycol, polyglycol ether, and the like, such as diethylene glycol, carbitol, methyl carbitol, and the like.

Optionally, there can be used anti-foam agents and a highly suitable agent for this purpose has been found to be a colloid silicone emulsion. When used, the anti-foam agent is used in the amount of about 0.5 to 1.5% by weight, based on the weight of the resin.

Similarly, thickeners and stabilizers are useful in the composition of the invention and there can be used thickeners of the type commonly used in thickening emulsions and dispersions, such as hydroxy ethyl or propyl cellulose, polyvinyl alcohol, methyl cellulose, guar gum, clay, polyacrylamide, and the like, the thickener being suitably used in the amount of about 0.5 to 1.5% by weight based on the weight of the resin.

Advantageously, a pigment dispersant such as sodium or potassium pyrophosphate, and like phosphates, can also be used and, when used, are suitably employed in the amount of about 0.4 to 0.6% by weight based on the weight of the pigment.

Useful in the primer composition, especially if it is to be used in cold climates, is a freezing stabilizer such as ethylene glycol or propylene glycol.

As drying accelerator for the resin, mixtures of polyvalent metal salts are preferably included in the composition of the invention in the total amount of about 1 to 4% by weight based upon the weight of the total resin. Preferably, as drying accelerators are used long-chain fatty acid salts of cobalt, manganese, zirconium, zinc and lead, and petroleum acid salts of these metals, such as their naphthenates.

As previously mentioned, it is a feature of the invention that my primer composition, in contrast to that of my prior U.S. Pat. No. 4,462,829, is water-thinnable, yet it is an effective coating for rusted metal and is an effective rust-converter, rust-inhibitor paint primer, and is adherent and compatible with a wide variety of substrates and overcoatings.

When used on clean or rusted metal, it is a feature of my primer composition that it can be applied directly over the rust, it merely being desirable to dust off loose pieces of the rust. Cleaning the rusted surface by chemical means before application of the primer composition is not necessary. The primer has a rust-converting and rust-inhibiting action, and can be applied by conventional means, such as brushing, rolling and spraying. The composition is effective not only to inhibit further corrosion but is effective to convert adherent rust on the surface of the substrate to a non-active or passive form which is not actively corrosive or rust-forming, as does the aliphaetic solvent-thinnable composition of my prior patent, U.S. Pat. No. 4,462,829.

My primer composition has a neutral pH in the range 6.5 to 7.5, and preferably a pH of 7.2. It contains no oxalic acid, tannic acid, phosphoric acid or other acidic chelating agents.

In addition to its effectiveness as a rust-converting and rust-inhibiting coating composition, however, the composition of this invention is of outstanding utility as a primer for a variety of substrates. It is essentially of universal applicability. For example, it effectively coats and adheres to essentially any prior coating, aluminum foil, iron, steel, stainless steel, copper, galvanized steel, aluminum, tin, core tan steel, concrete, polyurethane foam, rigid polyvinyl chloride, and other plastics, and the like. Indeed, it is eminently flexible, and for example, it will adhere to alumium foil even when the foil is sharply bent. It can be applied on damp surfaces.

It is organic-solvent resistant, including mineral spirits, e.g., it is resistant to glycol, alcohols, crude oil, diesel oil, chlorinated solvents, and the like. Similarly, it is resistant to acids such as hydrochloric, sulfuric, nitric and phosphoric acids, and to alkalies, such as sodium hydroxide, potassium hydroxide, and the like. The primer is oil resistant and resistant to salt water, bleaches such as sodium hypochlorite, and the like.

Similarly, the primer composition of the invention can be said to be "universal", i.e., it can be overcoated and will adhere firmly to oil-base and water-base paints of all types, chlorinated rubber, and even rubber itself. Thus, it can be used as a barrier coating to change paint systems. The primer can effectively withstand aliphatic, and aromatic hydrocarbon, ketone and glycol ester-containing coatings, and the like, and it can be top coated, for example, with 100% two-component solvent free epoxy, solvent free two-component polyurethane, fluoroelastomer and fluorocarbon base coatings.

As previously mentioned, it is a feature of the primer of the invention that it is water thinnable. As produced, it has a water content of about 30 to 50%, preferably 35 to 45%, by weight, with a total resin content of about 25 to 45%, preferably 25 to 30%, by weight, but it can be readily thinned to any desired resin content simply by adding water to it. Best results are obtained, however, with the resin-water relationships of the as-produced primer composition.

When the primer composition is applied, no extensive surface preparation is needed, it has a shelf life of several years, and it can be stored in plastic or metal containers. My primer composition is non-toxic, nonflammable, and it does not stain. It dries in less than an hour and can be overcoated in two hours. The coating of the primer composition withstands freeze-thaw cycles of at least 15, it has a heat resistance up to 235° F. and a dielectric strength able to withstand 1320 volts.

It can be used in the automobile, marine, railroad, utility, chemical, paper, and like industries and for general maintenance purposes.

The following specific examples will serve further to illustrate the invention and the features thereof. In the examples all parts are by weight.

EXAMPLE 1

One part of potassium tetrapyrophosphate, one part of propylene glycol, and 0.3 part of hydroxy ethyl cellulose are mixed with 24 parts of water to form a paste. To this paste are then added 5.5 parts of a soya-alkyd resin (36% phthalic anhydride), present as a solution in mineral spirits (60% solids), a drying accelerator for the resin composed of 0.12 part of cobalt naphthenate, 0.08 part of calcium naphthenate and 0.4 part of zirconium naphthenate, and one part of triethanolamine oleate, and the mixture is thoroughly mixed to form a dispersion. Pigment in the form of six parts of micronized $Fe_2O_3$(red oxide), four parts of calcium borosilicate, 7.5 parts of magnesium silicate and one part of zinc oxide is then added to the dispersion and the pigment ground to 6–7 Hegman. At this point, there are added 22 parts of a vinylidene chloride-vinyl chloride (approximately 5%) copolymer in the form of an aqueous emulsion (55% solids) together with 2.7 parts of methyl carbitol as a coalescing agent, and the pH of the entire dispersion is stablized at a value of 6.5–7.5.

EXAMPLE 2

One part of sodium tetrapyrophosphate, one part of ethylene glycol, and 0.3 part of guar gum are mixed with 18 parts of water to form a paste. To this paste are then added six parts of a soya-alkyd resin (23% phthalic anhydride) present as a solution in an aliphatic solvent (60% solids), a drying accelerator for the resin composed of 0.12 part of cobalt naphthenate, 0.08 part of calcium naphthenate and 0.4 part of zirconium nephthenate, and one part of triethanolamine oleate, and the mixture is thoroughly mixed to form a dispersion. Pigment in the form of 5.5 parts of micronized $Fe_2O_3$(red oxide), three parts of calcium borosilicate, one part of magnesium silicate and four parts of zinc oxide is then added to the dispersion and the pigment ground to 6–7 Hegman. At this point there are added 33 parts of a vinylidene chloride-vinyl chloride (approximately 10%) copolymer in the form of an aqueous emulsion (55% solids) together with three parts of methyl carbitol as a coalescing agent, and the pH of the entire dispersion is stabilized at a value of 6.5–7.5.

EXAMPLE 3

One part of potassium tetrapyrophosphate, one part of propylene glycol, and 0.3 part of hydroxy propyl cellulose are mixed with 30 parts of water to form a paste. To this paste are then added six parts of soya-alkyd resin (36% phthalic anhydride) present as a solution in an aliphatic solvent (60% solids), a drying accelerator for the resin composed of 0.12 part of cobalt naphthenate, 0.08 part of calcium naphthenate and 0.4 part of zirconium naphthenate, and one part of triethanolamine oleate, and the mixture is thoroughly mixed to form a dispersion. Pigment in the form of six parts of micronized $Fe_2O_3$(red oxide), four parts of calcium borosilicate, five parts of magnesium silicate and five parts of zinc oxide is then added to the dispersion and the pigment ground to 6–7 Hegman. At this point, there are added 28 parts of a vinylidene chloride-vinyl chloride (approximately 5%) copolymer in the form of an aqueous emulsion(55% solids) together with three parts of methyl carbitol as a coalescing agent, and the pH of the entire dispersion is stabilized at a value of 6.5–7.5.

EXAMPLE 4

Corrosion Resistance

Rusted steel panels were coated with the primer composition produced in Example 1. The primer was applied to provide a dry film thickness of three mils. The coated panels were allowed to dry in the air for 48 hours and were then exposed to a salt spray of 0.5% NaCl (ASTM Method B117). After 240 hours of exposure, the panels were examined. There was no evidence of a corrosion deposit on the surface of the primer coat.

EXAMPLE 5

Resistance to Mineral Spirits

Clean steel panels were coated with the composition of Example 1 and the coat dried for 24 hours. The panels were then immersed in mineral spirits for three months. When the panels were removed from the mineral spirits and examined, the coat was still completely intact and had not lifted in any way.

EXAMPLE 6

Resistance to Sodium Hypochlorite

Clean steel panels and aluminum foil were coated with the composition of Example 1 and prepared as described in Example 5 were immersed in a 15% aqueous solution of sodium hypochlorite for one week. Upon removal of the panels and the foil from the solution and reexamination, the coating was seen to be wholly intact in all cases.

EXAMPLE 7

Compatability to Top Coat

Rusted steel panels were coated with the primer of Example 1 as described in Example 4 and top coated with a top coat of epoxy resin. Adhesion was measured, using an Elcometer pull tester. Two dollies were attached to the white epoxy top coat and after one week curing the coatings were pulled off. In repeated tests, 500 pounds per square inch were required to cause any failure, and the failure occurred at the primer-rusted metal interface, not at the primer-top coat interface.

EXAMPLE 8

Steel panels were coated with the primer of Example 1 as described in Example 4 and top coated with 1. 2-component water-base epoxy
2. Acrylic enamel-solvent-base-automobile-aircraft finishes
3. 2-component solvent-free polyurethane
4. Fluoroelastomer
5. Nitrocellulose lacquer
6. High-solids, solvent-base vinyl marine paint
7. 2-component coal-tar epoxy
8. Oil-modified alkyd polyurethane The panels were allowed to stand until they were cured. Upon inspection, there was observed no lifting, alligatoring, blistering, or cracking, even though the top coat as applied contained various types of solvents.

Water-thinnable primers of the prior art to be applied over rusted metal require that the metal be cleaned down to white metal. The water-thinnable primer of this invention will go directly over rust and does not require this cleaning step. It will be obvious that various changes and modifications may be made without departing from the invention as defined in the appended claims. It is intended, therefore, that all matter contained in the foregoing description be interpreted as illustrative only and not in a limiting sense.

I claim:

1. A paint primer which can be water thinned and is effectively adherent to rusted metal and other substrates and to a variety of top coats, comprising: an aqueous emulsion or aqueous suspension of a vinylidene chloride-vinylchloride copolymer and an alkyd resin, the aqueous emulsion or aqueous suspension having a pH of about 7 and the alkyd resin being present in an amount of about ⅙ to ¼ by weight of the vinylidene chloride-vinylchloride copolymer, about 3 to 5% by weight of a triethanolamine salt as ionic surfactant, a drying accelerator composed of at least one polyvalent metal salt in an amount of about 1 to 4% by weight, about 8 to 15% by weight of a coalescing agent, and about 30 to 70% by weight of a pigment, all based on the weight of the total resin content of the primer.

2. A primer as defined in claim 1; wherein the vinylidene chloride-vinyl chloride copolymer is present in the amount of about 25 to 45% by weight of the primer.

3. A primer as defined in claim 1; wherein the vinylidene chloride-vinylchloride copolymer is present in the amount of about 35 to 45% of the primer.

4. A primer as defined in claim 1; wherein the coalescing agent is a polyglycol or a polyglycol ether.

5. A primer as defined in claim 1; wherein the pigment includes red oxide.

6. A primer as defined in claim 1; wherein the coalescing agent is methyl carbitol.

7. A primer as defined in claim 6; wherein the pigment includes red oxide.

8. A primer as defined in claim 6; wherein the alkyd resin contains about 36% phthalic anhydride.

9. A primer as defined in claim 1; further including a non-ionic surfactant.

10. A primer as defined in claim 1; further including a thickener.

11. A primer as defined in claim 1; further including a freezing stabilizer.

12. A primer as defined in claim 11; wherein the freezing stabilizer is propylene glycol.

13. A primer as defined in claim 1; wherein the primer is free of oxalic acid, tannic acid and phosphoric acid.

14. A primer as defined in claim 1; wherein the primer is free of acidic chelating agents.

15. A primer as defined in claim 1; wherein the primer has a pH in the range 6.5–7.5.

16. A primer as defined in claim 1; wherein the primer has a pH of 7.2.

* * * * *